United States Patent [19]
Gieryng

[11] Patent Number: 5,337,379
[45] Date of Patent: Aug. 9, 1994

[54] FIBER OPTIC COUPLING ASSEMBLY
[75] Inventor: Jan B. Gieryng, Cary, N.C.
[73] Assignee: Styrotech Corporation, Raleigh, N.C.
[21] Appl. No.: 88,798
[22] Filed: Jul. 8, 1993
[51] Int. Cl.$^5$ ............................................... G02B 6/36
[52] U.S. Cl. ........................................ 385/26; 385/19;
385/25; 385/27; 356/428; 250/551
[58] Field of Search ..................... 385/19, 25, 26, 27;
356/426, 428; 250/551

[56] References Cited
U.S. PATENT DOCUMENTS
| | | | |
|---|---|---|---|
| 4,587,812 | 5/1986 | Brega | 385/26 X |
| 4,958,904 | 9/1990 | Rawski | 385/26 |
| 5,140,289 | 8/1992 | Andrieu et al. | 382/26 X |

Primary Examiner—Rodney B. Bovernick
Assistant Examiner—Phan Thi Heartney
Attorney, Agent, or Firm—Shefte, Pinckney & Sawyer

[57] ABSTRACT

An optical transmission device for use on an apparatus for disposing a sleeve in encircling relation on an article unit is disclosed. Signals are sent and received between two data handling devices monitoring the machine. The first data handling device is positioned on a rotating portion of the apparatus and the second data handling device is positioned on another portion of the apparatus independent of the rotating portion. The optical transmission device comprises a first optical fiber element attached at a first end to the first rotating data handling device. The first element has an inner and an outer portion wherein the inner and outer portions are concentric. A second optical fiber element is also included and is attached at a first end to the second data handling device. The second element has an inner and an outer portion wherein the inner and outer portions are concentric and correspond to the inner and outer portions of the first element. The first and second elements each have second ends with the second ends facing each other with inner and outer end portions in correspondence with one another and positioned co-axial with the rotation axis of the rotating portion of the apparatus so that there is a gap between the second ends.

7 Claims, 3 Drawing Sheets

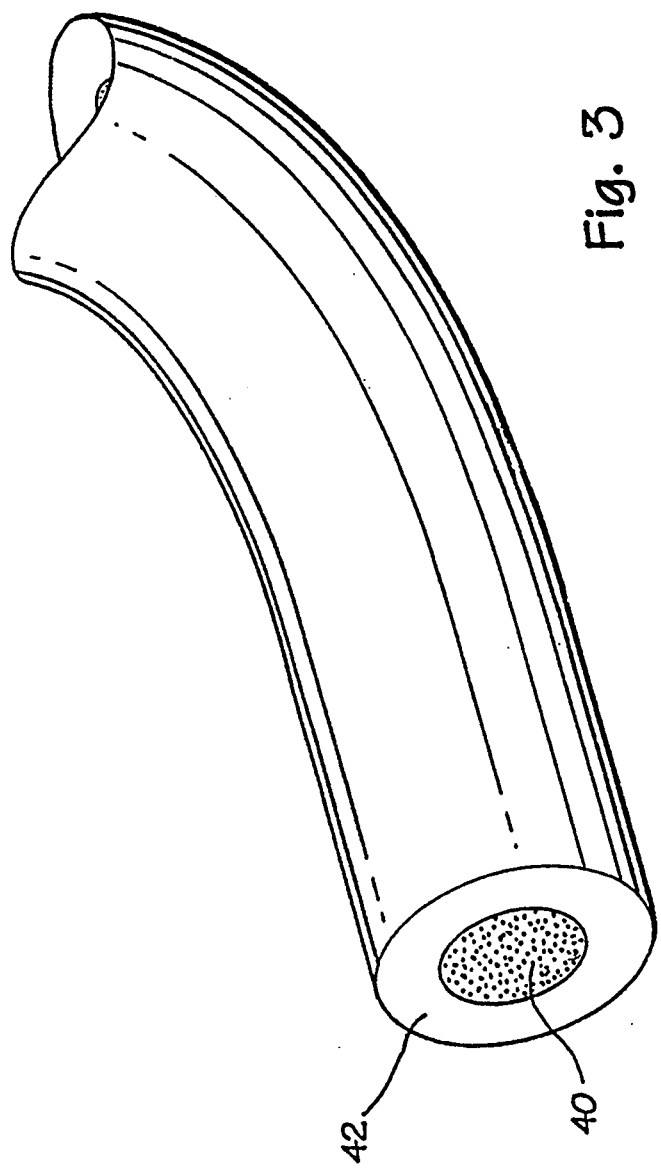

FIBER OPTIC COUPLING ASSEMBLY

BACKGROUND OF THE INVENTION

The present invention relates to an apparatus for simultaneously disposing tubular labels on a plurality of bottles, or containers, and, more particularly, to fiber optic cables for use in transferring control signals between two data handling devices thereon.

Sleeves or tubular labels having an endless shape have shown themselves to be particularly attractive for use as labels for bottle or containers. Such sleeves or tubular labels are most typically pre-printed plastic labels formed from thin flexible plastic film and these printed labels, commonly referred to as sleeve labels or tubular labels, have found wide use as labels for blow-molded plastic containers such as, for example, multi-liter soft drink bottles, other beverage bottles, and detergent chemical containers. A number of apparatus are available to place such labels on containers. One example of such an apparatus is disclosed in U.S. patent application Ser. No. 07/918,211 filed on Jul. 21, 1992, now allowed on Sep. 21, 1993 which is expressly incorporated herein by reference.

These machines are typically controlled via two data handling devices which are typically computers, such as programmable logic controllers (PLC). One PLC is usually situated on the rotating carousel portion of the machine and the other PLC is usually positioned off the rotating portion of the machine. Information preferably is transferred between the data handling devices via signals through fiber optic cable. In transferring these signals between the first PLC positioned on the carousel and the second PLC, difficulties arise with the tangling of the fiber optic cables due to the rotating arrangement.

One suggestion to eliminate a similar problem occurring on knitting machines is seen in U.S. Pat. No. 4,587,812 to Brega. Brega employs a gap between a first fiber optic cable and a second fiber optic cable to avoid tangling of the cables due to the relative rotation of the cables. However, the Brega system can transmit information in only one direction at any one time. This limitation makes Brega unsuitable for many applications requiring simultaneous dual transmission.

SUMMARY OF THE INVENTION

It is therefore an object of the present invention to provide a fiber optic communication system for use between data handling devices moving rotationally relative to one another.

It is another object of the present invention to provide a fiber optic communication system suitable for applications requiring simultaneous transmission of information between two data handling devices.

These and other objects of the present invention are provided with an optical transmission device for use on an apparatus for disposing a sleeve in encircling relation on an article unit. Signals are sent and received between two data handling devices monitoring the apparatus. The first data handling device is positioned on a rotating portion of the apparatus and the second data handling device is positioned on another portion of the apparatus independent of the rotating portion. The optical transmission device comprises a first optical fiber element attached at a first end to the first rotating data handling device. The first element has an inner and an outer portion wherein the inner and outer portions are concentric. A second optical fiber element is also included and is attached at a first end to the second data handling device. The second element has an inner and an outer portion wherein the inner and outer portions are concentric and correspond to the inner and outer portions of the first element. The first and second elements each have second ends with the second ends facing each other with inner and outer end portions in correspondence with one another and positioned coaxial with the rotation axis of the rotating portion of the apparatus so that there is a gap between the second ends. A first support device is also included wherein the second end of the first element is rotatably secured in its position and supported thereon. A second support device secures the second end of the second element in its position and supports it thereon. Thus, signals are transferred between the first and second data handling devices via the inner and outer elements and signals can be transferred between the first and second data handling device via the outer portion of the elements. The gap between these second ends preferably a fraction of an inch. However, exact dimension of the apparatus depends on the extent to which the signal transmission deteriorates in a particular application. The inner portion of the elements may transmit data from the first data handling device to the second and the outer portion may transmit data from the second data handling to the first data handling device or, alternatively, the outer portion may transmit data from the first data handling device to the second data handling device and the inner portion may transmit data from the second data handling device to the first data handling device. The gap may be surrounded by a device attached to each of the second ends which encloses the gap to protect the second ends from contaminants. The first support device comprises a pole element rotatably secured in its position at a first end and a table element secured to the pole element at a second end. The table element may have an aperture through which the second of the first element may travel for rotational movement at a top side plane of the table element. The second support device may comprise a surface having spacing devices positioned to contact the first support device, with the surface supported and spaced apart from the first support device by the spacing device and a surface having an aperture through which the second end of the second element may travel for positioning on an underside plane of the surface.

BRIEF DESCRIPTION OF THE DRAWINGS

FIG. 3 is an enlarged perspective view of a fiber optic cable of the present invention.

DESCRIPTION OF THE PREFERRED EMBODIMENT

Figure 1:
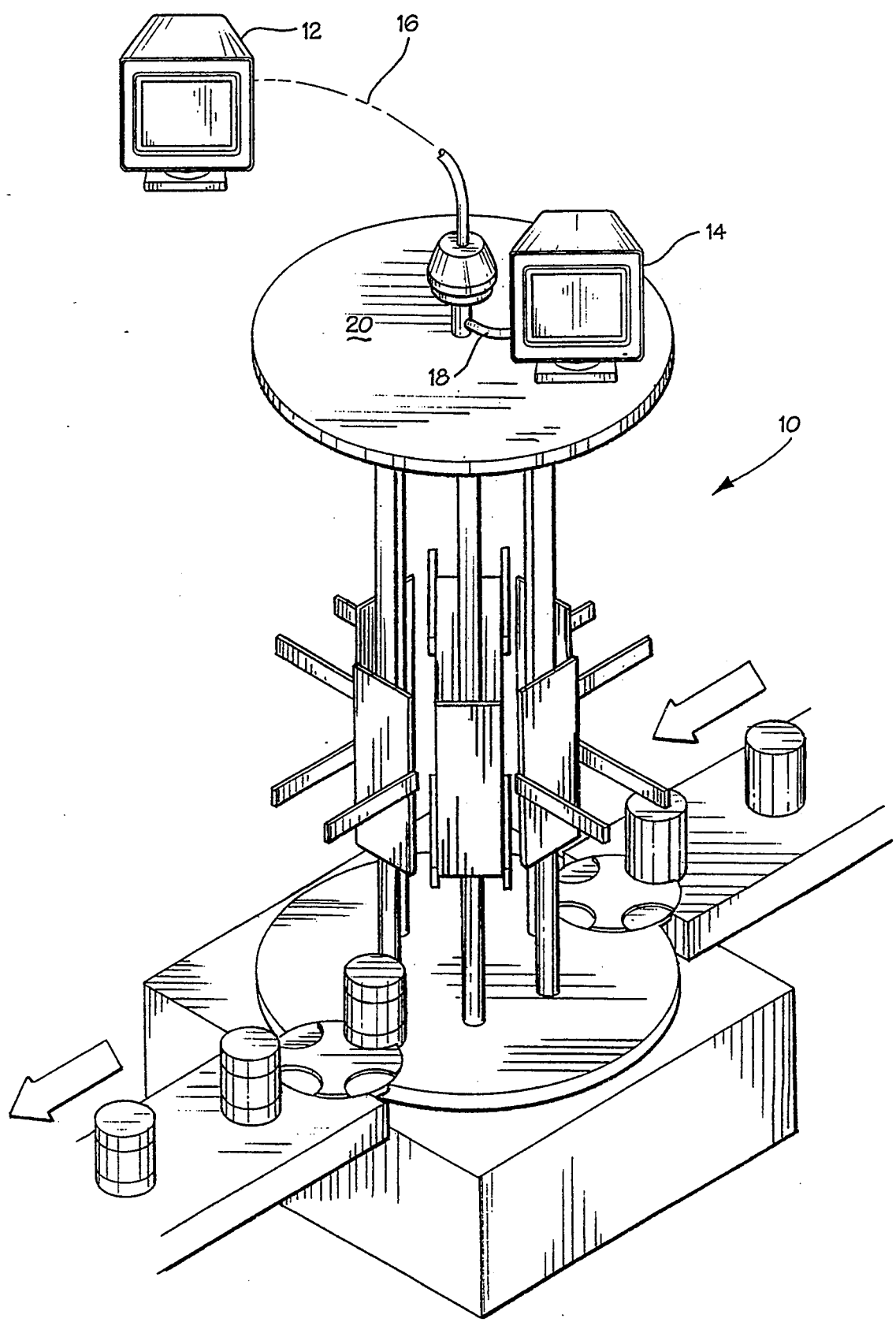
FIG. 1 is a perspective view of an apparatus for simultaneously disposing tubular labels on a plurality of bottles or other containers having two data control devices connected thereto.

Referring now to FIG. 1, there is shown an apparatus 10 for disposing tubular labels on a plurality of bottles or other contains having two data handling devices 12,14. The data handling devices communicate with one another via fiber optic cables 16,18. A data handling device 12 is positioned off and away from the rotating portion of the apparatus 10 while data handling device 14 is positioned on an upper surface 20 of apparatus 10. Thus, fiber optic cable 18 will be rotating with respect to fiber optic cable 16. In order to ensure accurate data transmission between fiber optic cables 16,18, the cables are positioned as shown in FIG. 2.

Figure 2:
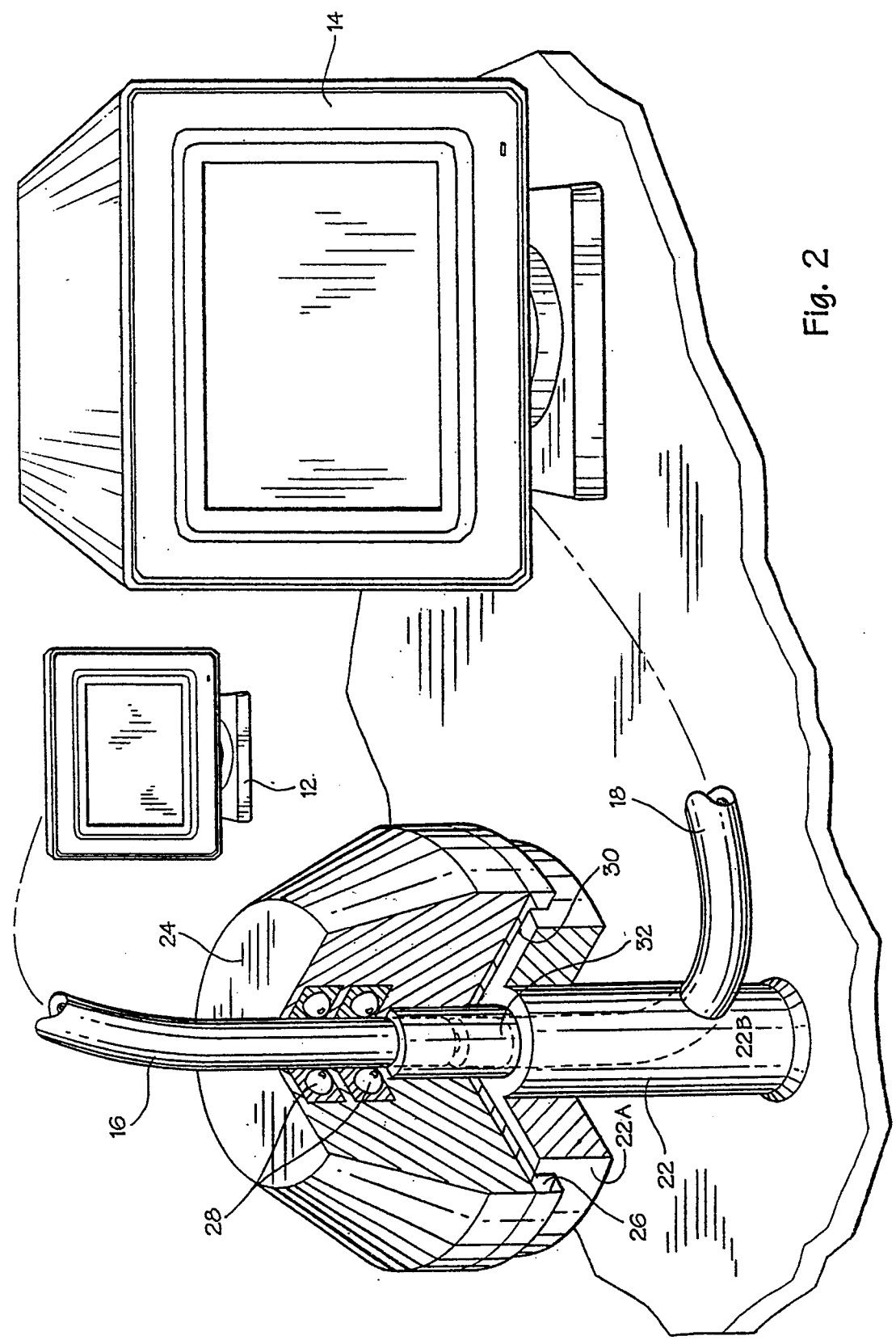
FIG. 2 is an enlarged perspective view of a preferred coupling of the fiber optic cables shown in FIG. 1 and showing, in partial vertical cutaway, the fiber optic coupling.

In FIG. 2, cable 18 is shown attached at a first end to data handling device 14 and at a second end to a first support device 22. The second end of cable 18 may be positioned on first support device 22 in a rotatable fashion under certain circumstances. Such situations include if first support device 22 and data handling device 14 are rotating at different speeds or if they rotate in different rotational directions or if first support device 22 is stationary. Cable 16 is attached at a first end to data handling device 12 and at a second end to a second support device 24. Second support device 24 may be spaced from first support device 22 via spacers 26 which may be protrusions from either the first or second devices or any other suitable devices. The second ends of cable 16 is attached to second support device 24 via ball bearing assemblies 28 which allow for rotation of second support device 24 to rotate around cable 16. The second ends of cables 16,18 are positioned within support structures 22,24, with the second ends facing each other and positioned co-axial with the rotation axis of the rotating portion of the apparatus upon which data handling device 14 is positioned. The second ends are positioned so that there is a gap 30 between the two ends. The gap is preferably one-thousandth of an inch. A sleeve or band 32 may also be employed which surrounds the gap and is attached to each of the second ends of cables 16,18 thereby enclosing the gap to protect the second ends from contaminants. The sleeve 32 is preferably loose enough to rotate around cable 16.

The first support device is preferably a T-shape having a table element 22A secured to a pole arm 22B with the second end of cable 18 positioned towards the top side plane of the table element 22A. The second support device 24 is preferably a slab-like surface in which the second end of cable 16 is positioned toward an underside of the plane of the slab.

Referring now to FIG. 3, a view showing a cross section of the fiber optic cables 16,18 is shown. The cables 16,18 have an inner portion 40 and an outer portion 42 allowing for simultaneous bi-directional transmission of information between the data handling devices 12,14. Moreover, the concentric nature of the inner portion 40 and the outer portion 42 allow for uninterrupted transmission of data between the data handling devices 12,14 even as the second ends of the cables 16,18 are rotating relative to one another.

In summary, a novel fiber optic cable assembly is described allowing for bi-directional simultaneous transmission of information between two data handling devices for an apparatus for disposing tubular labels on a plurality of bottles.

It will be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An optical signal transmission device for use on an apparatus having a rotating portion and being controlled by signals sent and received from two data handling devices, the first data handling device positioned on a rotating portion of the apparatus and the second data handling device positioned on another portion of the apparatus independent of the rotating portion, said optical signal transmission device comprising:

(a) a first optical fiber element having a first end attached to the first rotating data handling device, said first element having an extending length and having concentric inner and outer portions, said inner portion capable of transmitting a first signal and said outer portion being capable of transmitting a second signal which is different and distinct;

(b) a second optical fiber element having a first end attached at to the second data handling device, said second element having an extending length and having concentric inner and outer portions that correspond to said inner and outer portions of said first element, said inner and outer portions of said second element being capable of transmitting said first and said second signals, respectively, said first and second fiber optic elements each having second ends, said second ends facing each other with said inner and outer portions thereof disposed opposite to one another and positioned co-axial with the rotation axis of the rotating portion of the apparatus so that there is a gap between said second ends;

(c) a first support device in which said second end of said first element is rotatably secured in its position and supported thereon; and (d) a second support device in which said second end of said second element is secured in its position and supported thereon, whereby said first signal can be transferred between said first and said second data handling devices via said inner portion of said elements and whereby said second signal can be transferred between said first and said second data handling device via the outer portion of said elements.

2. An optical signal transmission device according to claim 1 wherein said inner portion transmits data from the first data handling device to the second data handling device and wherein said outer portion transmits data from the second data handling device to the first data handling device.

3. An optical signal transmission device according to claim 1 wherein said outer portion transmits data from the first data handling device to the second data handling device and wherein said inner portion transmits data from the second data handling device to the first data handling device.

4. An optical signal transmission device according to claim 1 and further comprising a shield surrounding said gap and attached to each of said second ends and enclosing said gap to protect said second ends from contaminants.

5. An optical signal transmission device according to claim 1 wherein said first support device comprises a pole element rotatably secured in its position at a first end and a table element secured to said pole element at a second end, said table element having an aperture through which said second end of said first element travels for rotational movement at a top side plane of said table element.

6. An optical signal transmission device according to claim 1 wherein said second support device comprises a surface means having spacing means positioned on said first support device, said surface means supported and spaced apart from said first support device by said spacing means and said surface means having an aperture through which said second end of said second element travels for positioning on an underside plane of said surface means.

7. An optical signal transmission device for use on an apparatus for disposing a sleeve in encircling relation on an article unit, the apparatus being controlled by signals sent and received from two data handling devices, the first data handling device positioned on a rotating portion of the apparatus and the second data handling device positioned on another portion of the apparatus independent of the rotating portion, said optical signal transmission device comprising:

(a) a first optical fiber element attached at a first end to the first rotating data handling device, said first element having concentric inner and outer portions, said inner portion capable of transmitting a first signal and said outer portion being capable of transmitting a second signal which is different and distinct from said first signal;

(b) a second optical fiber element attached at a first end to the second data handling device, said second element having concentric inner and an outer portions wherein said inner and outer portions are concentric and correspond to said inner and outer portions of said first element, said inner and outer portions of said second element being capable of transmitting said first and said second signals, respectively, said first and second elements each having second ends, said second ends facing each other with inner and outer portions in correspondence with one another and positioned co-axial with the rotation axis of the rotating portion of the apparatus so that there is a gap between said second ends;

(c) a first support device in which said second end of said first element is rotatably secured in its position and supported thereon; and (d) a second support device in which said second end of said second element is secured in its position and supported thereon, whereby said first signal can be transferred between said first and said second data handling devices via said inner portion of said elements and whereby said second signal can be transferred between said first and said second data handling device via the outer portion of said elements.

* * * * *